(12) United States Patent
Gupta et al.

(10) Patent No.: US 6,204,429 B1
(45) Date of Patent: Mar. 20, 2001

(54) METHODS OF REMEDIATION OF CHEMICAL CONTAMINANTS DISPERSED IN GEOLOGIC MEDIA

(75) Inventors: Yogendra M. Gupta; Ramamurthi Mahalingham, both of Pullman, WA (US)

(73) Assignee: Washington State University Research Foundation, Pullman, WA (US)

(*) Notice: Subject to any disclaimer, the term of this patent is extended or adjusted under 35 U.S.C. 154(b) by 0 days.

(21) Appl. No.: 09/285,507

(22) Filed: Apr. 2, 1999

Related U.S. Application Data
(60) Provisional application No. 60/080,005, filed on Apr. 3, 1998.

(51) Int. Cl.$^7$ .............................. A62D 3/00; G21F 9/00; C07C 1/00; B09B 1/00
(52) U.S. Cl. ...................... 588/227; 588/17; 204/157.15; 405/128
(58) Field of Search .................. 204/157.15; 588/17, 588/227; 405/128

(56) References Cited

U.S. PATENT DOCUMENTS
| | | | | |
|---|---|---|---|---|
| 4,513,402 | * | 4/1985 | Devaure | 367/73 |
| 5,098,538 | * | 3/1992 | Kim et al. | 204/182.2 |

OTHER PUBLICATIONS

Dodson, Brian W. and Charles Arnold, Jr., "Shock–Induced Activation of Acrylamide Polymerization," *J. Phys. Chem.*, 87(16):3023–3024 (1983). No Month Available.

Gupta, Y. M., et al., "Experimental facility to produce and measure compression and shear waves in impacted solids$^a$)," *Rev. Sci. Instrum.*, 51(2):183–194 (1980). No Month Available.

Graham, R.A., et al., "Materials Modification and Synthesis Under High Pressure Shock compression," *Ann. Rev. Mater. Sci.*, 16:315–341 (1986). No Month Available.

Flinn, J.E., et al., "Dynamic consolidation of type 304 stainless–steal powders in gas gun experiments," *J. Appl. Phys.* 64(3):1446–1456 (1988). No Month Available.

Hikichi, Kunio, et al., Two–Dimensional $^1$H and $^{13}$C Nuclear Magnetic Resonance Studies of Poly(acrylamide), *Polymer Journal*, 20(10):851–859 (1988). No Month Available.

Ignatovice, T.N., et al., "Polymerization in a Shock Wave II. Acrylamide," *High Energy Chem.*, 4:394–397 (1970). No Month Available.

Lee, S.I., et al., "Catalytic Polymerization of Phenylacetylene by Cationic Rhodium and Iridium Complexes of Ferrocene–Based Ligands," *J. Polymer Sci., Part A: Polymer Chem.*, 34:2377–2386 (1996). No Month Available.

Matsunami, S., et al., "Thermal isomerization of cis–poly(phenylacetylene). Scission of polymer main–chain and formation of 1,3,5–triphenylbenzene as a pyrolysis product," *Polymer*, 37(21):4853–4855 (1996). No Month Available.

Minier, Leanna M., et al., "Role of Intermolecular Reactions in Thermolysis of Aromatic Nitro Compounds in Supercritical Aromatic Solvents," *J. Org. Chem.*, 56:3306–3314 (1991). No Month Available.

National Materials Advisory Board, National Research Council, *Shock Compression Chemistry in Materials Synthesis and Processing*, Publication NMAB–414, National Academy Press, Washington, D.C. (1984). No Month Available.

Tirey, Debra., et al., "Gas Phase Formation of Chlorinated Aromatic Compounds from the Pyrolysis of Tetrachloroethylene," *Combust. Sci, and Tech.*, 74:137–157 (1990). No Month Available.

* cited by examiner

*Primary Examiner*—Edna Wong
(74) *Attorney, Agent, or Firm*—Christensen O'Connor Johnson Kindness PLLC

(57) ABSTRACT

Chemically contaminated soil samples are subjected to a shock wave sufficient in amplitude and duration to induce polymerization and/or decomposition of the contaminant chemicals.

6 Claims, 6 Drawing Sheets

METHODS OF REMEDIATION OF CHEMICAL CONTAMINANTS DISPERSED IN GEOLOGIC MEDIA

This application claims the benefit of provisional application Ser. No. 60/080,005 filed Apr. 3, 1998. +gi Work leading to the present invention was supported by the United States Air Force Office of Scientific Research under Grant No. F49620-96-1-0078. The government has certain rights in the invention.

FIELD OF THE INVENTION

This invention relates to the use of shock waves or large amplitude stress waves for in-situ remediation of chemically contaminated soils. More specifically, shock waves, of an amplitude and duration sufficient to induce decomposition and/or polymerization of organic chemical dispersed in geologic media, are administered to a soil site to reduce the levels of harmful chemicals.

BACKGROUND OF THE INVENTION

There exists an immediate need for remediation of contaminated sites thiroughout the world. A sampling of the massive environmental remediation problem in the United States can be seen from a list of contaminated sites/facilities requiring cleanup: Superfund sites, 1,500–2,100; Resource Conservation and Recovery Act (RCRA) action sites, 1,500–3,500; underground storage tanks, 295,000; DOD facilities, 7,300 sites at 1,800 installations; DOE facilities, 4,000 sites at 110 installations; other federal agencies, 350 sites; and, other state agencies, 19,000 sites. A high percentage of the sites require soil remediation; most of them have contaminants in common: solvents, petroleum products, metals, and metal salts. In many cases, different cleanup programs will use similar treatment technologies. At Superfund sites, for example, one of the greatest potential needs for innovative technologies is treatment of ground water in place, without pumping to the surface (pump and treat). At the 500 National Priorty List (NPL) sites, the common contaminants are volatile organic compounds at 60% of the sites, metals at 53%, and semi-volatile compounds at 27%. Given the magnitude of the contamination problem, the development of remediation methodologies that can treat very large quantities of contaminated soil is an important need.

In environmental remediation, it is often desirable to treat soils and groundwater in-situ, due to regulatory, economic, and technical considerations, as opposed to treating through ex-situ methods. Early soil remediation techniques utilized mainly ex-situ methods such as soil washing and incineration. In-situ methods have the advantage of precluding the need for removal and disposal, incineration, or above-ground treatment of the contaminated soil. Over the past decade, in-situ methods have attracted increasing attention because they are likely cost-effective, less hazardous, and minimize disruption to the environment. However, the long time periods required for typical in-situ biorememdiation methods limits the practical utility of these approaches. A comprehensive eight-volume series on innovative site and waste remediation technologies, published by WASTECH, reviews the practical aspects of these and other technologies relevant to the present invention [Anderson, W. C. (Ed.), *Innovative Site Remediation Technology—Eight*-Volume Series, WASTECH (American Academy of Environmental Engineers), Annapolis, Md., 1994].

Shock waves have been used to initiate chemical reactions in both organic and inorganic compounds [Graham, R. A., Morosin, B., Venturini, E. L. and Carr, M. J., *Ann. Rev. Mater. Sci.*, 16:315 (1986); National Materials Advisory Board, National Research Council, *Shock Compression Chemistry in Materials Synthesis and Processing*, Publication NMAB-414, National Academy Press, Washington D.C. (1984)]. A well known example of shock induced chemical reaction is the detonation of high explosives [Fickett, W. and Davis, W. C., *Detonation*, University of California Press, Los Angeles (1979)]. Unlike previous studies on neat materials [National Materials Advisory Board, National Research Council, *Shock Compression Chemistry in Materials Synthesis cand Processing*, Publication NMAB-414, National Academy Press, Washington D.C. (1984)], the interest for soil remediation involves chemical changes in organic contaminants dispersed in geologic media.

It is a fundamental principle of chemistry that energy must be imparted to a chemical compound in order to change its structure. For in-situ soil remediation, the problem is one of how to transmit energy throughout a contaminated site in a form that is efficient at inducing desirable chemical conversions, i.e. changing toxic chemical compounds into nontoxic ones. Thus, while it is well known that large amplitude shock waves produce profound physiochemical changes in both pure energetic (e.g. detonation of high explosives) and non-energetic materials, there has been no prior showing that shock waves induce chemical changes in chemical contaminants in geological media, e.g., soil. Also, the relationship between the shock loading conditions (e.g., pulse amplitude and duration) and the inducement of chemical changes in compounds dispersed in geologic media has not previously been established.

SUMMARY OF THE INVENTION

In one aspect of the present invention, a method is provided for soil remediation. In the practice of the invention, a shock wave is administered to soil contaminated with organic chemicals. When the shock wave has an effective amplitude and duration, the contaminating organic compounds undergo a shock wave induced decomposition and/or polymerization. The present inventive remediation method may be used to perform in-situ treatment of contaminated soils that is rapid and cost effective.

Shock waves have the following features: a) large compression, b) large increase in temperature, c) nonhydrostatic or shear deformation, and d) short time scales. The principal advantage of shock induced remediation is the potential to treat large volumes of contaminated soil very rapidly through judicious placement of high explosives or other sources of rapid and large energy releases in the ground. High amplitude shock waves generate large pressure and temperature changes over a small time interval. These pressure and temperature changes imparted by the shock wave then induce a conversion of toxic compounds into nontoxic ones.

Chemical conversions effective in chemical decontamination include the induction of polymerization and/or decomposition of the chemical contaminants. Polymerization reactions convert small molecules, capable of rapid movement into a water table, into large, molecular aggregates, whose rate of movement in a soil structure is much slower. The formation of polymeric molecules also, in many instances, dramatically alters the toxicity of its constituent compounds. In contrast, chemical decomposition results in the breakdown of toxic organic compounds into smaller nontoxic molecules.

In order to obtain an effective shock wave method for the in-situ remediation of contaminated soil it is preferable to design the shock load parameters (i.e., amplitude and duration) that induce desired chemical changes in compounds dispersed in geologic media.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1A is an illustration of a light gas gun used for shock wave experiments as described herein.

FIG. 1B shows the details of the copper cell and the impactor plate used in the light gas gun of the Examples;

DETAILED DESCRIPTION OF THE PREFERRED EMBODIMENTS

Figure 13:
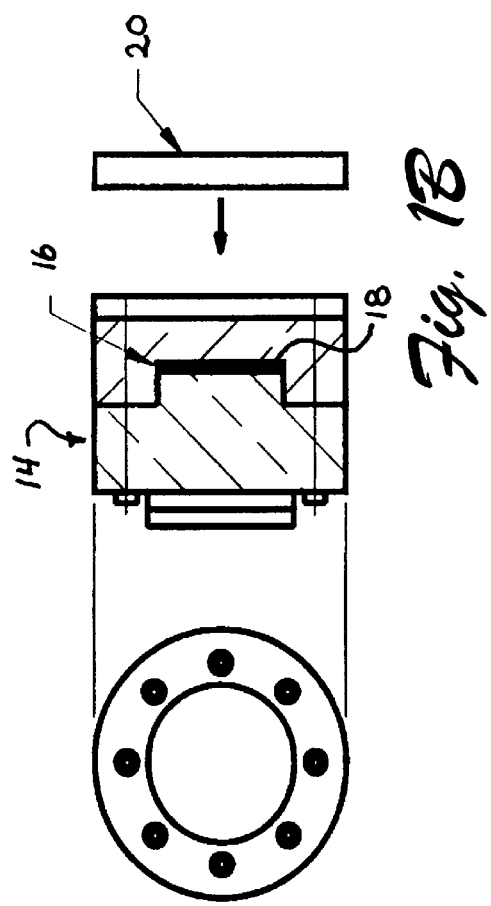
Figure 14:
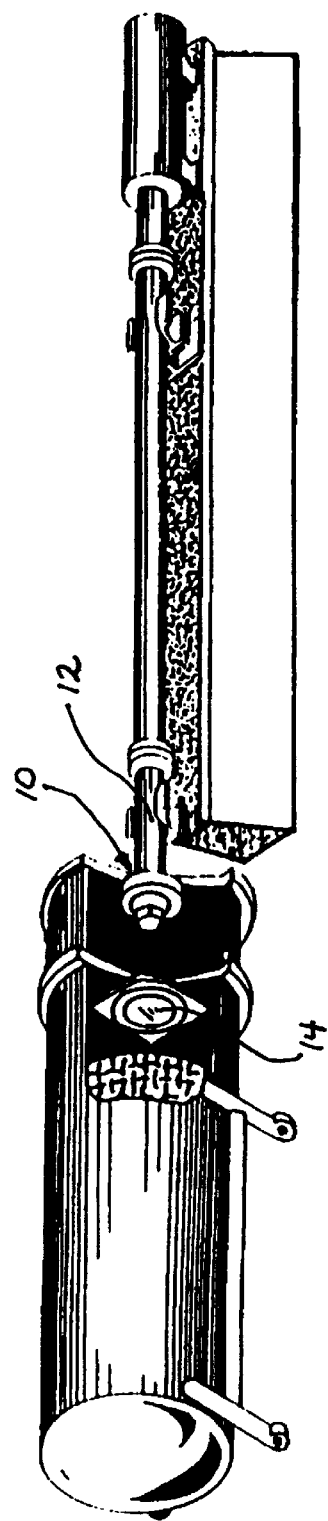

In accordance with one aspect of the invention, a method is provided for remediation of chemically contaminated soil comprising administering to the soil a shock wave of sufficient amplitude and duration to induce chemical degradation and/or polymerization of the chemical contaminants.

Shock waves, also referred to in the art as compression waves or stress waves, are large amplitude waves that typically last for a short duration. For purposes of the present invention, effective shock waves are those that generate a soil stress pulse of sufficient amplitude and duration to induce chemical decomposition and/or polymerization of organic contaminants in the soil. The actual parameters of the shock wave employed will vary depending upon the composition of the contaminated soil, the nature and concentration of the contaminants to be converted, the size of the treatment site, and other factors influencing the nature and effectiveness of the shock wave at a particular remediation site. In presently preferred embodiments of the invention, the shock waves employed will have a sufficient amplitude to result in peak stresses (S. P. Marsh, *LASL Shock Hugoniot Data*, University of California Press, Berkeley, Calif., 1980, page 57) in the range of about 0.1 to about 50 GPa, more preferably about 1 to about 25 GPa, and most preferably about 2 to about 15 GPa, for a period of about 0.5 to about 500 microseconds ($\mu s$), more preferably about 1 to about 100 $\mu s$, and most preferably about 2 to about 20 $\mu s$. The shock waves may be generated in situ using mechanical impact and/or explosive techniques well known to those skilled in the art in the mining and oil recovery fields. For example, representative oil shale recovery techniques using explosive forces are disclosed in representative U.S. Pat. Nos.: 1,913,395; 1,191,636; 2,418,051; 3,001,776; 3,586, 377; 3,434,757; 3,661,423; 3,951,456; 3,980,339; 4,007, 963; 4,017,119; 4,105,251; 4,120,355; 4,126,180; 4,133, 380; 4,149,752; 4,153,300; 4,158,467; 4,177,886; 4,185, 871; 4,194,788; 4,199,026; 4,210,867; 4,210,868; 4,231, 617; 4,243,100; 4,263,969; 4,265,486; 4,266,608; 4,271, 904; 4,315,656; 4,323,120; 4,323,121; 4,328,863; 4,343, 360; 4,343,361; 4,353,418; and 4,378,949. For in situ remediation, the detonation of explosive charges is presently preferred for generation of shock waves for use in the present invention.

Over the years many different types of explosives, blasting agents and incendiary devices have been developed for use in mining and oil recovery operations. Some of the more widely used explosives include nitroglycerin (dynamite) and trinitrotoluene (TNT). In more recent years ammonium nitrate fuel oil (ANFO) has been the more widely used as an explosive because it is less expensive and more effective than dynamite and TNT. ANFO is a mixture of ammonium nitrate and No. 2 diesel fuel oil. Typifying the many types of explosives, blasting agents and incendiary devices are those shown in U.S. Pat. Nos. 2,530,491; 2,615,800; 2,886,424; 2,975,046; 2,987,389; 3,004,842; 3,032,450; 3,094,069; 3,147,163; 3,150,019; 3,180,768; 3,240,641; 3,279,965; 3,388,014; 3,447,978; 3,453,155; 3,722,410; and 4,475,965, as well as in the *SME Mining Engineering Handbook*, published by the Society of Mining Engineers of the American Institute of Mining, Metallurgical, and Petroleum Engineers Inc., Volume 1 pages 11–88 to 11–96 and pages 17–139 to 17–142 (1973) and in Clark, G. B., "Basic Properties of Ammonium Nitrate Fuel Oil Explosives (ANFO)," *Quarterly of the Colorado School of Mines* 76(1) :1–32 (1981). The disclosures of the foregoing references are incorporated herein by this reference.

When explosive charges are employed in the generation of shock waves for use in situ, a sufficient explosive charge will generally be employed to generate a pressure at the point of explosion on the order of about 1 to about 500 kilobar (kbar), more preferably about 10 to about 250 kbar, and most preferably about 20 to about 150 kbar.

In the practice of the invention the contaminated soil may be subjected with the shock wave treatment of the invention in a single occurrence, or may be subjected to two or a plurality of successive shock waves, as may be desired for optimum chemical conversion under the conditions of a particular treatment site.

Laboratory experiments to examine the use of shock waves for soil remediation have been successfully performed, as is described in detail infra. In these experiments, six organic compounds (acrylamide (AA), benzonitrile (BN), diphenylacetylene (DPA), nitrobenzene (NB), phenylacetylene (PA), and tetrachloroethylene (TCE)) were individually dispersed in Ottawa sand at an upper-limit concentration of 10 wt. % and subjected to shock pulses approximately 9.6 GPa in amplitude and 2–3 µs in time duration. The shock treated samples were recovered and analyzed using various analytical techniques. The chemical analyses demonstrated that under the particular shock conditions selected, AA, TCE, and PA underwent shock-induced polymerization while NB underwent decomposition. These results demonstrate that shock waves may be used for rapid, in-situ remediation of contaminated soils.

The foregoing may be better understood by reference to the following examples, which are provided for illustration and are not intended to limit the scope of the inventive concepts.

EXAMPLES

Overall Approach

Six organic compounds and a single representative soil, subjected to shock wave loading, were examined. Two spectroscopic techniques were used for the initial chemical analyses: Fourier Transform Infrared (IR) measurements were used to detect shock-induced reactions and Ultraviolet Visible (UV) measurements were used to estimate the extent of the reaction. Significant changes in the IR spectrum of the shocked sample, when compared to that of the control sample, demonstrated shock-induced reaction. Initially, experiments were performed on admixtures of the organic compounds in sodium chloride (NaCl). This simplified the chemical analysis procedure because NaCl is transparent to IR and UV light. Once shock-induced reaction was observed, the NaCl was then replaced by a representative soil. For in-depth structural analyses of the shock products, additional chemical analyses were performed.

Materials and Sample Preparation

Six organic compounds (acrylamide (AA), benzonitrile (BN), diphenylacetylene (DPA), nitrobenzene (NB), phenylacetylene (PA), and tetrachloroethylene (TCE)) were examined according to the approach outlined above. They were selected because they are easy to handle, have been previously studied in a neat form under shock conditions, and several of them are potential environmental contaminants. All chemicals were purchased from Aldrich and used as received (AA, electrophoresis grade; BN, HPLC grade; DPA, 98%; NB, 98%; PA, 98%; and TCE, HPLC grade). Ottawa sand, a naturally occurring $SiO_2$, was selected as the representative soil because sand is a major constituent of soils encountered in most waste sites. The Ottawa sand used in this work had a specific gravity of 2.63 g $cm^{-3}$ and a particle size range of 145 µm–254 µm. It was thoroughly washed first with concentrated sulfuric acid and then with distilled water until the washings were neutral. Mixtures of AA or DPA, which are solids at room temperature, were prepared by mixing the organic compound with either NaCl or Ottawa sand in chloroform to form a slurry. After subsequent complete evaporation of the solvent, a well dispersed mixture of AA or DPA within the substrates was obtained. Mixtures of PA, NB, BN or TCE, which are liquids at room temperature, were prepared by mechanically mixing the organic compound with the substrates in a clean vial. The concentration of all mixtures thus prepared varied from 1 wt. % to 10 wt. %.

Shock Experiments

The samples were subjected to shock wave loading using a light gas gun as described in Gupta, Y. M., Keough, D. D., Walter, D. F., Dao, K. C., Henely, D. and Urweider, A., *Rev. Sci. Instr.* 51:183–194 (1980), and Flinn, J. E., Williamson, R. L., Berry, R. A., Wright, R. N., Gupta, Y. M. and Williams, M., *J. Appl. Phys.* 64(3):1446–1456 (1988), the disclosures of which are incorporated herein by this reference, with the modifications shown in FIG. 1. In the light gas gun, a flat copper plate 10 mounted on a projectile 12 is accelerated, using compressed gas (helium or nitrogen), to the desired velocity and impacted on a copper cell 14 containing the sample 16. The impactor plate 20 (3.18 cm diameter and 0.3 cm thick) and the cylindrical copper cell 14 (3.18 cm diameter and 1.08 cm thick) are shown in FIG. 1B. The sample cavity 18 volume was approximately 0.25 $cm^3$. For each shock experiment, two identical cells were loaded; the sample void fraction in each cell was approximately 0.2 by volume. One of the cells was used for the actual shock experiment while the other served as a control. The latter was treated the same as the shocked sample except for impact loading. All of the experiments reported here had an impact velocity of 0.5 km/s. This impact velocity and the flyer plate thickness used in this work resulted in stress pulses that were 9.6 GPa in amplitude and had durations of 2–3 µs.

After shock loading, the samples were recovered to permit post-shock analyses. IR (Perkin Elmer, Spectrum 2000, with Harrick diffuse reflectance attachment) and UV (DU 65 Beckman) spectroscopy were employed primarily to detect and quantify shock induced reactions. Since NaCl is non-interfering in both techniques, no separation of the organic components from the substrate was necessary. When Ottawa sand was used, the organic compound had to be separated out from the sand by solvent extraction, followed by centrifugation. The extent of reaction was estimated by comparing the maximum absorbance of the organic contaminant in the UV spectra of the control and the shocked sample. Methanol was used as the solvent for all UV analyses except for AA where water was adequate. For detailed structural analysis of the control and shocked samples, proton nuclear magnetic resonance (H-NMR; Brulker AMX 300), GC-MS (HP 5890 II/5989A), and MALDI-TOF (Matrix Assisted Laser Desorption Ionization—Time of Flight) mass spectrometry (PerSeptive Biosystems, Vestec Products) were also used.

The followincn Table 1 summarizes the typical results for the six compounds studied.

TABLE 1

Summary results from six organic compounds.

| Sample Mixture | Shock-induced changes detected | Extent of reaction* (%) |
|---|---|---|
| 1 wt. % AA/NaCl | yes | 39 ± 9 |
| 10 wt. % TCE/NaCl | yes | — |
| 10 wt. % PA/NaCl | yes | 61 ± 2 |
| 10 wt. % NB/NaCl | yes | 47 ± 4 |
| 10 wt. % AA/Sand | yes | 27 ± 18 |
| 10 wt. % TCE/Sand | yes | 49 ± 18 |
| 10 wt. % PA/Sand | yes | 86 ± 3 |
| 10 wt. % NB/Sand | yes | 51 ± 13 |

TABLE 1-continued

Summary results from six organic compounds.

| Sample Mixture | Shock-induced changes detected | Extent of reaction* (%) |
|---|---|---|
| 5 wt. % DPA/NaCl | no | <1 |
| 10 wt. % BN/NaCl | no | <1 |

*Averaged from a set of 2–3 experiments per sample mixture; estimated by UV and GC-MS spectroscopy. The deviations indicated are a consequence of the limited number of experiments conducted.

All experiments were conducted under comparable loading conditions. Two of the six compounds (BN and DPA) failed to react under the particular experimental condition selected; likely requiring stronger shock waves. In this section, the results and discussion for each of the organic com pounds that reacted (AA, TCE, PA, and NB) are organized as follows: first, the evidence for shock-induced reactions is presented; second, the structure of the products is discussed; and finally, the likely reaction pathways are indicated.

In discussing the spectral evidence for shock-induced reactions, only the IR spectra of the organic compound/NaCl mixtures are presented here for clarity, because comparable IR spectra from the organic compound/Ottawa sand mixtures were partially obscured by the bands from the solvent used for the extraction process (mostly OH bands due to methanol or moisture).

Acrylamide

Figure 2:
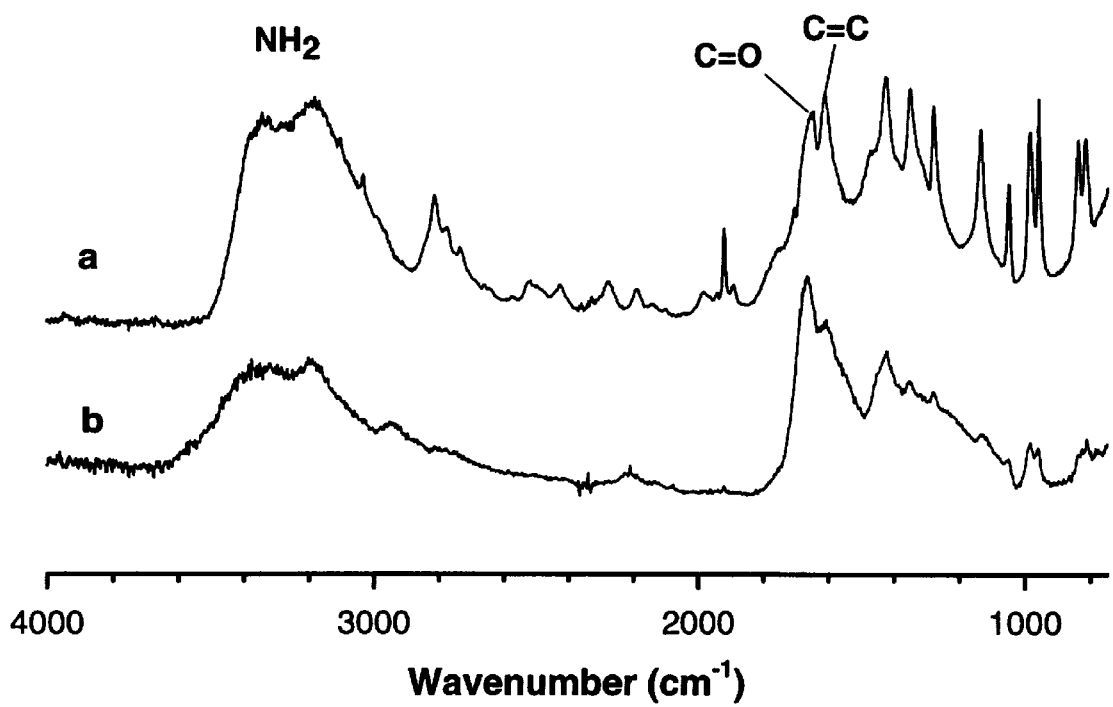
FIG. 2 is an Infrared (IR) spectrum of a 1 wt. % acrylamide (AA) in NaCl; (a) is a control and (b) is a shocked sample.

There are significant spectral differences between the IR spectra of the control and shocked 1 wt. % AA/NaCl samples. As shown in FIG. 2, in the shocked sample spectrum, the intensity of the C=C band is lower than that of the C=O; the opposite is observed in the spectrum of the control sample. Also, the intensity of the sharp bands between 1500 cm$^{-1}$ to 750 cm$^{-1}$ is substantially lower in the shocked sample spectrum than it is in the control sample spectrum. Clearly, the AA was modified chemically by shock loading.

Figure 3:
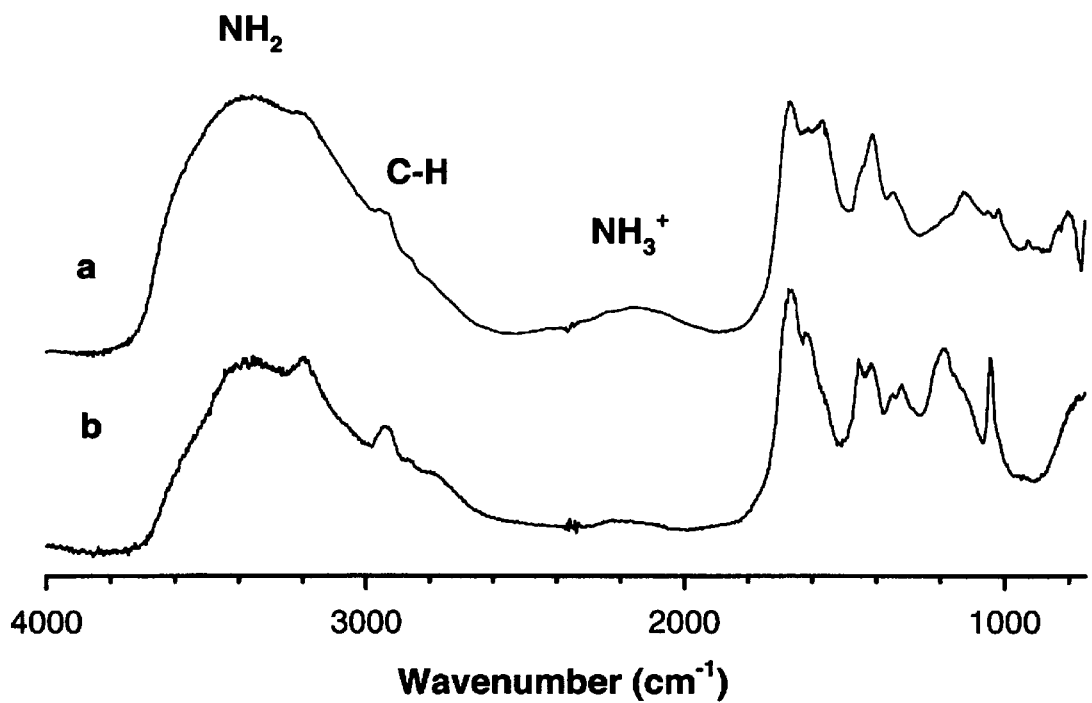
FIG. 3 is an IR spectrum of (a) an aqueous extract of a 10 wt. % acrylamide/Ottawa sand shocked sample; and (b) commercial polyacrylamide.
Figure 4:
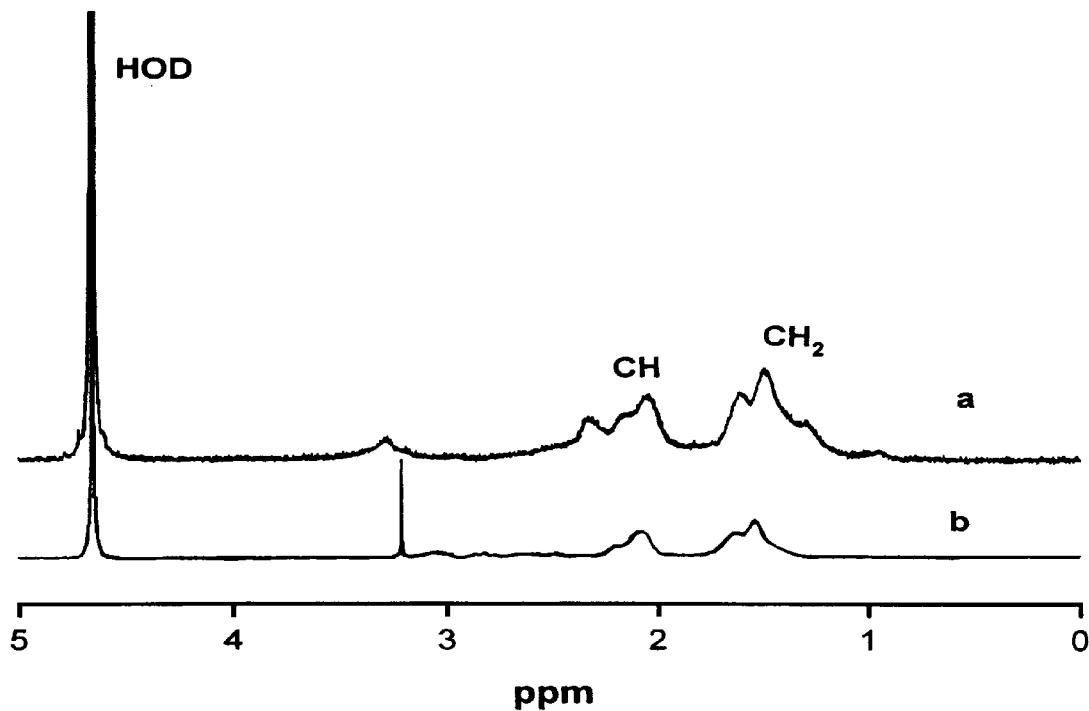
FIG. 4 is a Proton NMR spectrum in $D_2O$. (a) An aqueous extract of a 10 wt. % acrylamide (AA)/Ottawa sand shocked sample; and (b) commercial polyacrylamide.

The shock product from 10 wt. % AA/Ottawa sand could not be examined directly in the IR or UV as mentioned earlier. Hence, it was extracted first into methanol and then into water. The methanol and aqueous extracts were analyzed using IR and NMR measurements. While the methanol extract gave an IR and NMR spectra that are similar to those for pure AA, the spectra of the aqueous extract are very different. The latter match well with those of a commercial linear polyacrylamide (PAA). For example, most of the IR bands from PAA (FIG. 3(b)) can be seen in the spectrum of the aqueous extract (FIG. 3(a)) as well; particularly, the C—H bands at 2866 and 2939 cm$^{-1}$, and the NH$_3^+$ band at 2178 cm$^{-1}$. In FIG. 4, the NMR spectrum of the aqueous extract shows the type of aliphatic protons that are characteristic of PAA. Two major sets of multiplets are observed: one at 1.1 ppm to 1.7 ppm and another at 1.9 ppm to 2.4 ppm; they represent the CH$_2$ and the CH protons of the polymer backbone, respectively [Hikichi, K, Ikura, M, and Yasuda, M., *Polymer Journal*, 20(10):851–859 (1988)]. Based on the spectral evidence observed, PAA was the major product in the shock-induced reaction of AA in Ottawa sand. This conclusion is consistent with the literature on shock compression of neat AA (e.g., Dodson, B. W. and Arnold, C. Jr., *J. Phys. Chem.*, 87(16):3023–3024 (1983); Ignatovich, T. N., Barkalov, I. M., Dulin, I. N., Zubarev, V. N., and Yampol'skii, P. A., *High Energy Chem.*, 4:394–397 (1970)).

The mechanism for shock-induced polymerization of AA likely involves free radicals since a substantial concentration of free radicals was reported, using electron spin resonance (ESR) measurements, in the shocked samples of neat AA [Dodson et al., supra]. While not wishing to be bound to any particular theory, it is likely that the effect of shock waves on AA is the generation of free radicals, possibly through bond rupture, e.g.,

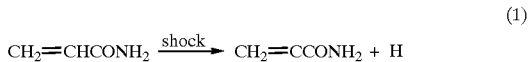
(1)

Either radical could be used for the initiation of AA in normal addition polymerization pathways, yielding a linear PAA as the final product; e.g., when H is used, one may write:

(I) Initiation:

(2a)

(II) Propagation:

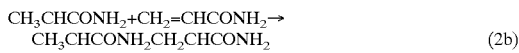
(2b)

(2c)

(III) Termination:

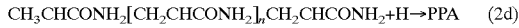
(2d)

Tetrachloroethylene

Figure 5:
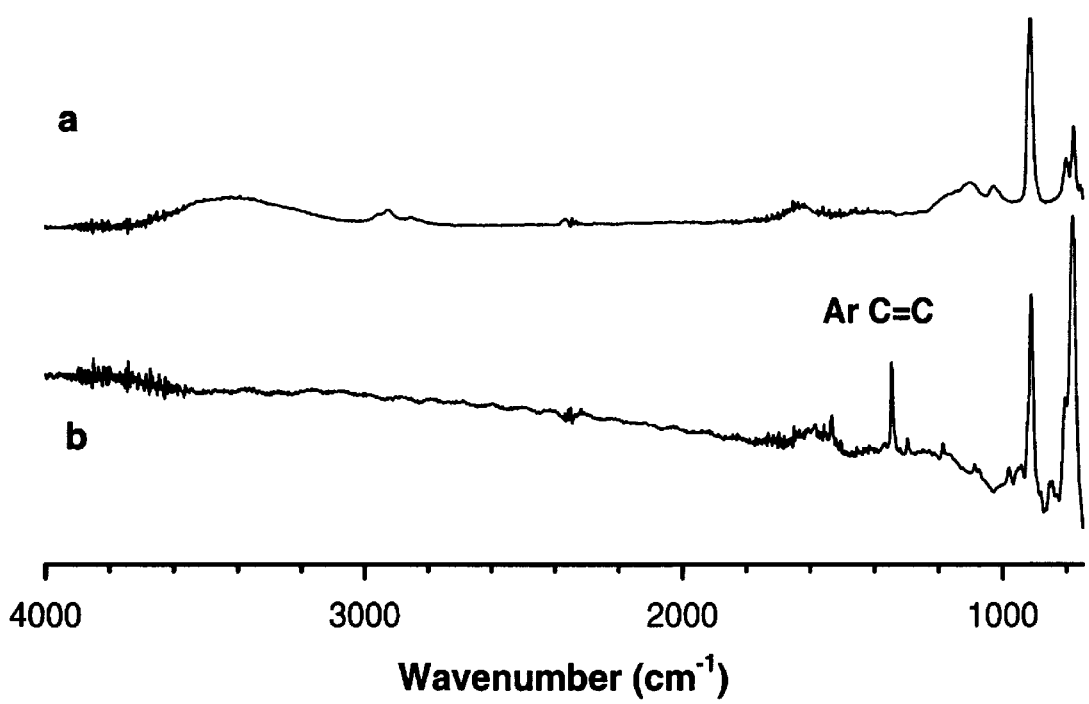
FIG. 5 is an IR spectrum of a 10 wt. % tetrachloroethylene (TCE) in NaCl; (a) control and (b) shocked.

The typical IR result from the 10 wt. % TCE/NaCl experiment is shown in FIG. 5. At least one extra band (i.c., the sharp band at 1346 cm$^{-1}$) and perhaps another one at 1530 cm$^{-1}$ are observed in the spectrum of the shocked sample. The new bands were not present in the spectrum of the control sample, and are typical of the aromatic system, Ar C=C, stretch. In the IR spectrum of the shocked 10 wt. % TCE/Ottawa sand sample (not shown), both bands were distinctly observed at comparable intensity. Clearly, TCE dispersed either in NaCl or in Ottawa sand had been chemically modified by the shock loading.

Figure 6:
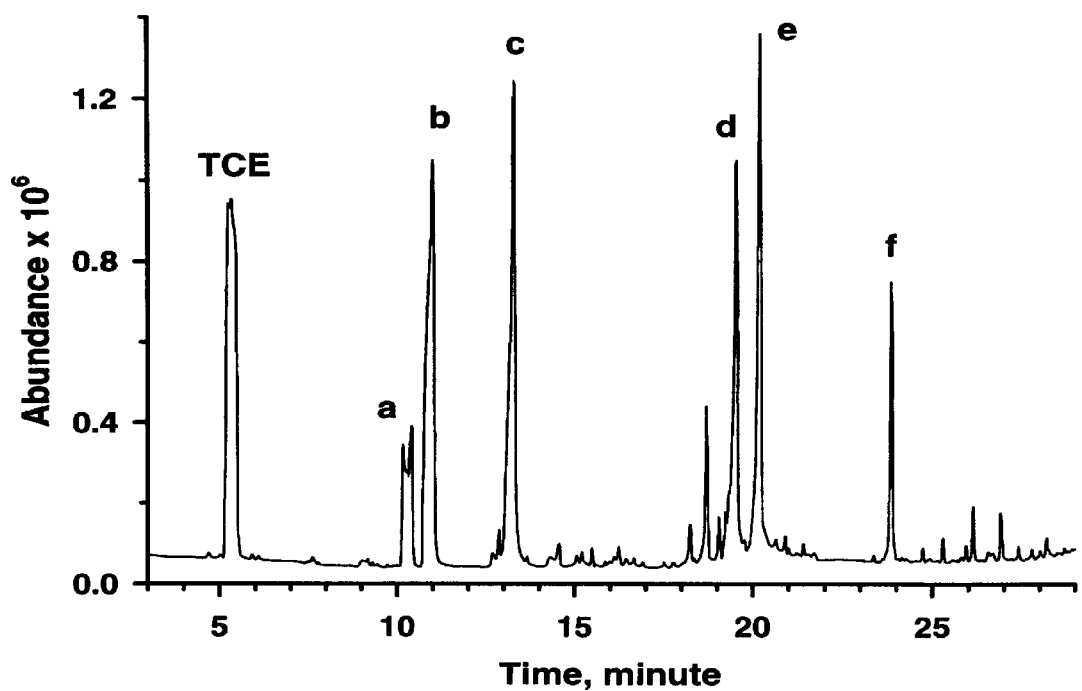
FIG. 6 is a GC-MS total ion chromatogram from 10 wt. % tetrachloroethylene (TCE)/Ottawa sand shocked sample extract in methanol-$d_4$; (a) trideutero trichloropropenoate; (b) hexachloroethane; (c) hexachloro-1,3-butadiene; (d) octachloro-2-butene; (e) hexachlorobenzene; (f) octachlorostyrene.

The total ion chromatogram from a shocked 10 wt. % TCE/Ottawa sand sample is shown in FIG. 6. Table 2 summarizes all the major products and their concentrations relative to the most abundant component in the product mixture, i.e., relative abundance.

TABLE 2

Typical products from 10 wt. % TCE, PA and NB in Ottawa sand*

| Compound | Peak Label in Figures† | Relative Abundance‡ |
|---|---|---|
| (I) 10 wt. % TCE/Ottawa sand: | | |
| Tetrachloroethylene (C$_2$Cl$_4$) | TCE | 100 |
| Trideutero trichloropropenoate (C$_4$D$_3$Cl$_3$O$_2$) | a | 31.3 |
| Hexachloroethane (C$_2$Cl$_6$) | b | 82.9 |
| Hexachloro-1,3-butadiene (C$_4$Cl$_6$) | c | 72.0 |
| Octachloro-2-butene (C$_4$Cl$_8$) | d | 47.9 |
| Hexachlorobenzene (C$_6$Cl$_6$) | e | 64.5 |
| Octachlorostyrene (C$_8$Cl$_8$) | f | 21.8 |
| (II) 10 wt. % PA/Ottawa sand: | | |
| Phenylacetylene (C$_8$H$_6$) | PA | 100 |
| Styrene (C$_8$H$_8$) | a | 24.4 |
| 1H-indene (C$_9$H$_8$) | b | 15.3 |
| Naphthalene (C$_{10}$H$_8$) | c | 20.6 |
| Biphenyl (C$_{12}$H$_{10}$) | d | 37.4 |

TABLE 2-continued

Typical products from 10 wt. % TCE, PA and NB in Ottawa sand*

| Compound | Peak Label in Figures† | Relative Abundance‡ |
|---|---|---|
| 4-methyl-phenanthrene ($C_{15}H_{12}$) | e | 20.6 |
| 1-(phenylmethylene)-1H-indene ($C_{16}H_{12}$) | f | 38.9 |
| 2-phenyl-naphthalene ($C_{16}H_{12}$) | g | 23.7 |
| 1,3-diphenylbenzene ($C_{18}H_{14}$) | h | 18.3 |
| 1,2,4-triphenylbenzene ($C_{24}H_{18}$) | i | 71.8 |
| 1,3,5-triphenylbenzene ($C_{24}H_{18}$) | j | 38.2 |
| (III) 10 wt. % NB/Ottawa sand: | | |
| Benzaldehyde ($C_7H_6O$) | — | <0.5 |
| Phenol ($C_6H_6O$) | — | 1.4 |
| Benzonitrile ($C_7H_5CN$) | — | <0.5 |
| Nitrobenzene ($C_6H_5NO_2$) | — | 100 |
| Biphenyl ($C_{12}H_{10}$) | — | 0.7 |
| 3-nitro-1,1'-biphenyl ($C_{12}H_9NO_2$) | — | <0.5 |

Figure 8:
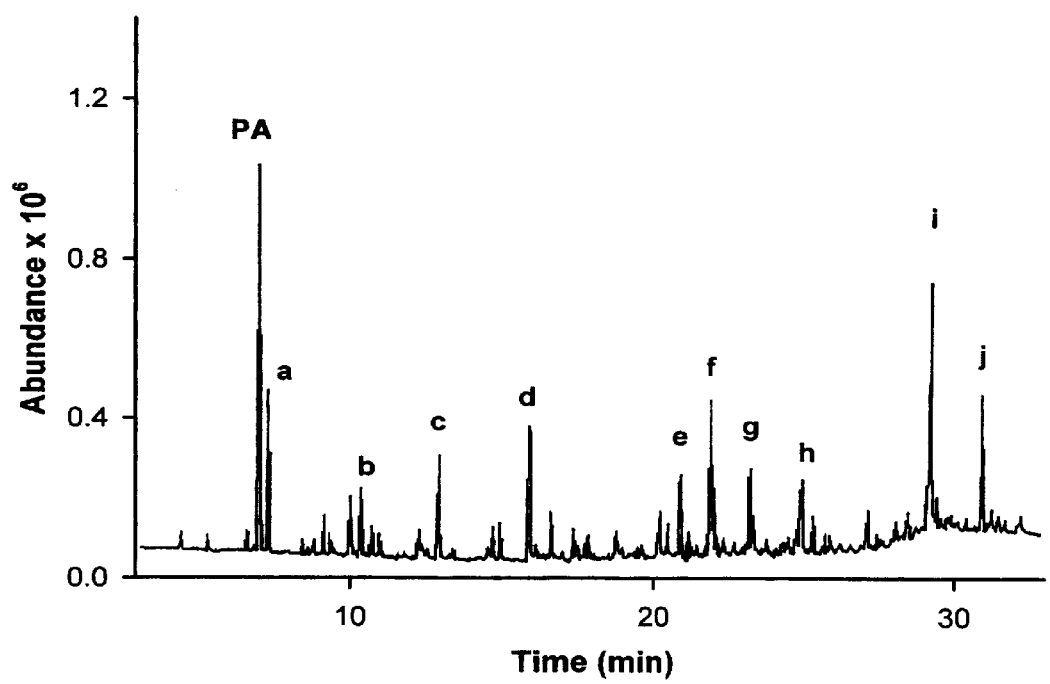
FIG. 8 is a GC-MS total ion chromatogram from 10 wt. % phenylacetylene (PA)/Ottawa sand shocked sample extract in methanol-$d_4$; (a) styrene; (b) 1H-indene; (c) naphthalene; (d) biphenyl; (e) 4-methyl-phenanthrene; (f) 1-(phenylmethylene)-1H-indene; (g) 2-phenyl-naplhthalene; (h) 1,3-diphenylbenzene; (i) 1,2,4-triphenylbenzene; (j) 1,3,5-triphenylbenzene.

*Products were extracted into either methanol-$d_4$ or chloroform-d and identified by GC-MS.
†Peak labels correspond to those listed in FIG. 6 for TCE and FIG. 8 for PA.
‡Normalized to the most abundant component in the shocked sample extract.

Clearly, the shocked sample consists of not only unreacted TCE ($C_2Cl_4$) but also a few other chlorinated shock products. These products have been identified, by matching mass spectra to a spectral library, as $C_2Cl_6$, $C_4Cl_6$, $C_4Cl_8$, $C_6Cl_6$, and $C_8Cl_8$, which correspond to peaks labeled b, c, d, e, and f in FIG. 6, respectively. A significant amount of trideutero trichloropropenoate, $C_4D_3Cl_3O_2$, i.e., peak a in FIG. 6, was also detected. The origin of a could be linked to the extraction process since the samples were extracted with deutero methanol, $CD_3OD$. The presence of trideutero trichloropropenoate confirms the presence of substantial densities of active centers, probably free radicals. A simple reaction between $CO_2$, $CD_3OD$ and $C_2Cl_3$ can account for the formation of the deutero product. No such deutero compound could be detected in the extract of the control sample.

All products from TCE/Ottawa sand can be explained through a combination of simple or polymeric TCE condensation and chlorine addition reactions. For instance, $C_2Cl_6$ is most likely the product of TCE—chlorine addition, i.e., $$CCl_2\!=\!CCl_2 + Cl_2 \longrightarrow CCl_3CCl_3 \quad (3a)$$
$$(TCE) \qquad\qquad\quad (C_2Cl_6)$$

As no free chlorine exists in the control samples, it must have come from other shock-induced reactions such as the condensation of TCE. The presence of $C_4Cl_6$ and $C_4Cl_8$ in the products also support this view. While $C_4Cl_6$ is likely the condensation product of two TCE molecules, $C_4Cl_8$ is probably derived from the addition of chlorine to $C_4Cl_6$, i.e., $$2\,CCl_2\!=\!CCl_2 \longrightarrow CCl_2\!=\!CClCCl\!=\!CCl_2 + Cl_2 \quad (3b)$$
$$(C_4Cl_6)$$

$$CCl_2\!=\!CClCCl\!=\!CCl_2 + Cl_2 \longrightarrow CCl_3CCl\!=\!CClCCl_3 \quad (3c)$$
$$(C_4Cl_8)$$

By the same reasoning, the two aromatic products, $C_6Cl_6$ and $C_8Cl_8$, may also be explained through polymeric TCE condensation reactions, i.e., $$3\,CCl_2\!=\!CCl_2 \longrightarrow \quad (3d)$$
$$CCl_2\!=\!CClCCl\!=\!CClCCl\!=\!CCl_2 + 2\,Cl_2$$

$$CCl_2\!=\!CClCCl\!=\!CClCCl\!=\!CCl_2 \xrightarrow{\text{hexachlorobenzene}} \quad (3e)$$
$$C_6Cl_6 + Cl_2$$

$$C_6Cl_6 + CCl_2\!=\!CCl_2 \xrightarrow{\text{octachlorostyrene}} C_8Cl_8 + Cl_2 \quad (3f)$$

Except for $C_2Cl_6$, all the products obtained by shock loading could also be detected in the pyrolysis of TCE [Tirey, D. A., Taylor, P. H., Kasner, J., and Dellinger, B., Combust. Sci. and Tech., 74:137–157 (1990)]. Thus, it seems likely that both pressure and temperature played a role in the formation of the shock products in TCE/Ottawa sand.

Phenylacetylene

Figure 7:
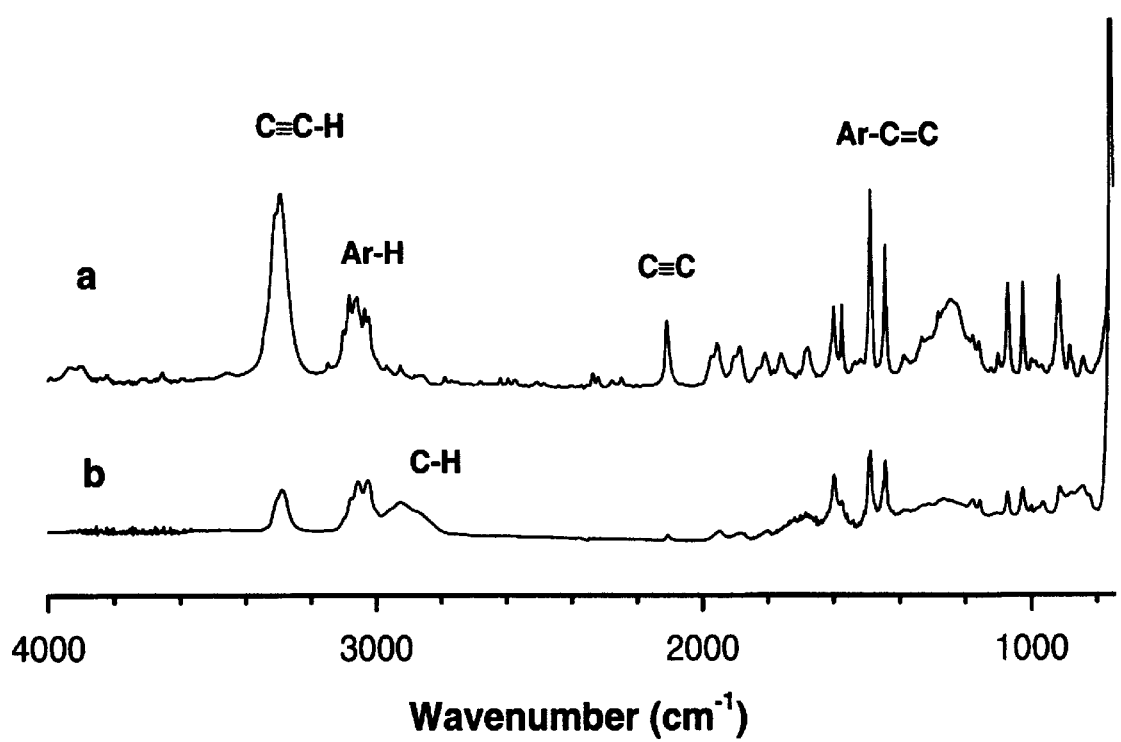
FIG. 7 is an IR spectrum of a 10 wt. % phenylacetylene (PA) in, (a) NaCl, control; (b) NaCl, shocked.

FIG. 7 shows the IR spectra of the control (a) and shocked (b) 10 wt. % PA/NaCl samples. The major spectral changes observed in the shocked sample spectrum, when compared to that of the control sample, include the following: (i) the intensity of the C≡C—H and C≡C bands is much lower; (ii) one of the aromatic system's stretch bands, Ar—C=C, has almost disappeared (the one at 1570 cm$^{-1}$); (iii) the aromatic hydrogens, Ar—H, multiplet appear to be less complex (turned into a quasi-doublet); and, most interestingly, (iv) a new broad band appears near 2800 cm$^{-1}$ to 3000 cm$^{-1}$. This new band is characteristic of an aliphatic C—H stretch. Again, similar IR spectral features were observed in the spectrum of the PA/Ottawa sand shocked sample except for the obscuring residual solvent bands. Thus, the PA in both NaCl and Ottawa sand had been modified by the shock waves.

The products from 10 wt. % PA/Ottawa sand are insoluble in most organic solvents other than $CS_2$ and, to a smaller extent, chloroform. FIG. 8 shows the total ion chromatogram of a shocked sample. A large number of aromatic hydrocarbons were detected. Table 2 lists a few major products and their relative abundances; they are labeled as a through j in FIG. 8. Of the products in the shocked sample, triphenylbenzenes are the most abundant, e.g. i and j. Styrene, a, and 1-(phenylmethylene)-1H-indene, f, were present also in the control sample, most likely as impurities.

Figure 9:
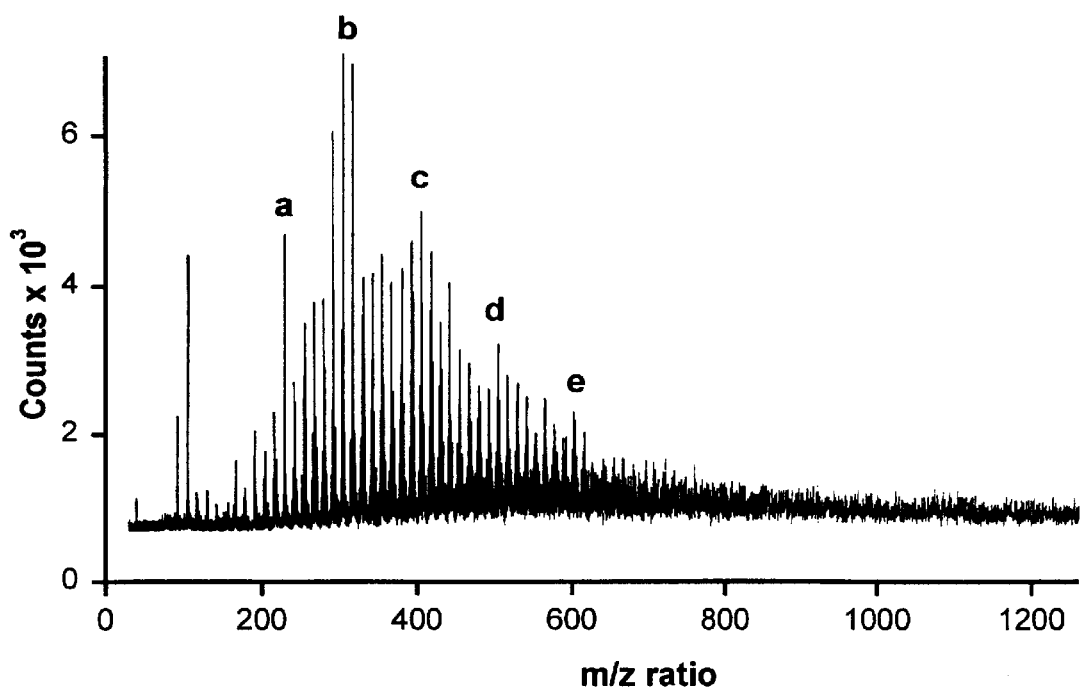
FIG. 9 is a MALDI-TOF mass spectrum of a 10 wt. % phenylacetylene (PA)/Ottawa sand shocked sample extracted into $CS_2$ (without matrix). a, b, c, d, and e are the discrete signals correspond to diphenylbenzene, the trimer (or triphenylbenzene), tetramer, pentamer and hexamer of polyphenylacetylene, respectively.

The fact that the products do not dissolve readily in a solvent suggested that they might contain high molecular weight compounds. Thus, a few MALDI-TOF mass spectra of the products were taken. FIG. 9 shows a typical mass spectrum of the shock products without a matrix (there is no matrix material that is miscible with the products). The continuum of signals covering a range of mass-to-charge (m/z) ratio from 150 to 800 implies that the products from PA/Ottawa sand are polymeric. Superimposed on this continuum are a few intense signals, marked a, b, c, d and e in FIG. 9. From their m/z ratios, they can be associated with the following: a) terphenyl or 1,3-diphenylbenzene; b) phenylterphenyl or 1,2,4- and 1,3,5-triphenylbenzene; c, d and e) the respective tetramer, pentamer and hexamer of polyphenylacetylene (PPA). The maximum of the continuum is located close to 306 m/z; thus, the triphenylbenzenes or the trimer of PA are the major products. This is consistent with the result from the GC-MS (i.e., triphenylbenzenes are the most abundant product in the shocked sample mixture; see Table 2).

The NMR spectrum of a shocked 10 wt. % PA/Ottawa sand sample (not shown here) consisted of two broad and featureless signals: a prominent one between 6 ppm and 9 ppm and a weak one between 0 ppm to 5 ppm. This usually implies the presence of a complex polymer (totally symmetrical polymers, however, may yield sharp NMR signals). The fact that the NMR spectrum of the products shows no vinyl proton (which, if present, as in linear polyphenylacetylene (PPA) (see PPA structure formula below), would appear somewhere close to 6 ppm) indicates that it is a cross-linked PPA, i.e., (4)

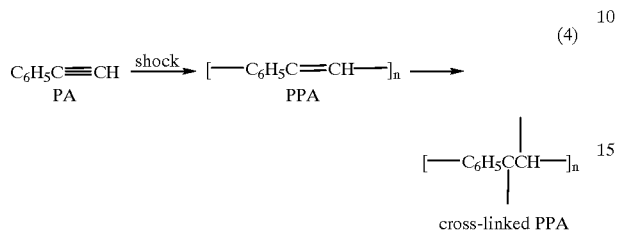

The cross-liiked nature of the polymer is mirrored in its IR spectrum as well. The IR spectrum of the linear PPA reported in the literature [e.g., see FIG. 3 in Lee, S. I., Shim, S. C., and Kim, T. J., *J. Polymer Sci., Part A. Polymer Chem.*, 34:2377–2386 (1996)] is similar to the one produced under shock loading except for the extra band between 2800 $cm^{-1}$ and 3000 $cm^{-1}$ that is characteristic of aliphatic C—H stretching (see formula for cross-linked PPA above). This is also consistent with the observed low solubility of the product(s).

Hence, there is little doubt that shock-induced polymerization was observed in the PA/Ottawa sand mixtures. One possible explanation for the numerous minor products as revealed by GC-MS, e.g., the di- and triphenylbenzenes is that the heat generated during shock compression could have thermally transformed the initial products (linear or cross-linked PPA) into various minor hydrocarbons. In a recent report [Matsunami, S., Watanabe, T., Kamimura, H., and Kakuchi, T., *Polymer*, 37(21):4853–4855 (1996)] on thermal isomerization of cis-PPA, the linear polymer was found to be thermally transformed into 1,3,5-triphenylbenzene and an unidentifiable polymer (a broad H-NMR signal between 5 ppm and 8 ppm) at temperature as low as 453 K. Equally possible is that the minor products detected in the GC-MS were actually generated in the GC instrument, where relatively high temperatures (573 K at injection port and 523 K at column) were used.

Nitrobenzene

Figure 10:
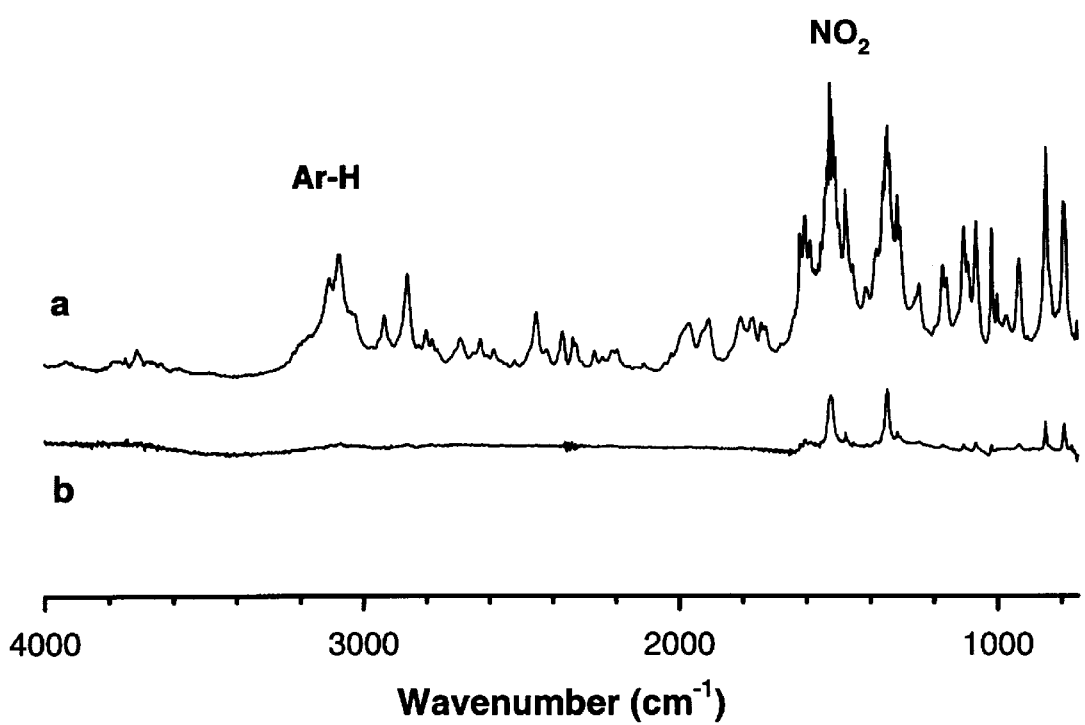
FIG. 10 is an IR spectrum of a 10 wt. % nitrobenzene (NB) in NaCl; (a) control and (b) shocked.

FIG. 10 shows the typical IR result from 10 wt. % NB/NaCl mixture. There is a major spectral difference between the control and shocked sample spectra. The changes, however, are seemingly due to a substantial decrease in the concentration of NB in the shocked sample. All other techniques used (UV, NMR and GC-MS) for the chemical analyses of the samples pointed to the same conclusion, i.e., the major component in the shocked samples was the uiireacted NB, and that its concentration was substantially lower than that in the control samples. Since loss of NB due to evaporation is not likely (its vapor pressure is extremely low, i.e., 0.133 kPa at 317 K as opposed to 0.133 kPa at 252 K for TCE [Lide, D. R., *Handbook of Chemistry and Physics*, 71st ed., CRC press (1991)]) we conclude that NB had undergone shock-induced decomposition rather than polymerization. The decomposition products are probably volatile and could not be retained at the end of each experiment. This precludes any serious elucidation of the reaction pathways for the shock reaction. Nevertheless, from the small amount of phenol, biphenyl and nitrobiphenyl detected in the shocked samples (see Table 2), one can still put forward a reasonable degradation pathway for NB. For instance, the products obtained here, amongst other volatile species such as NO, $NO_2$, $H_2O$, and $C_6H_6$, could also be observed in the pyrolysis of NB in supercritical benzene [Minier, L. M., Brower, K. R., and Oxley, J. C., *J. Org. Chem.*, 56:3306–3314 (1989)], where high static pressure and high temperature conditions exist (100 MPa; 563–653 K), e.g.,

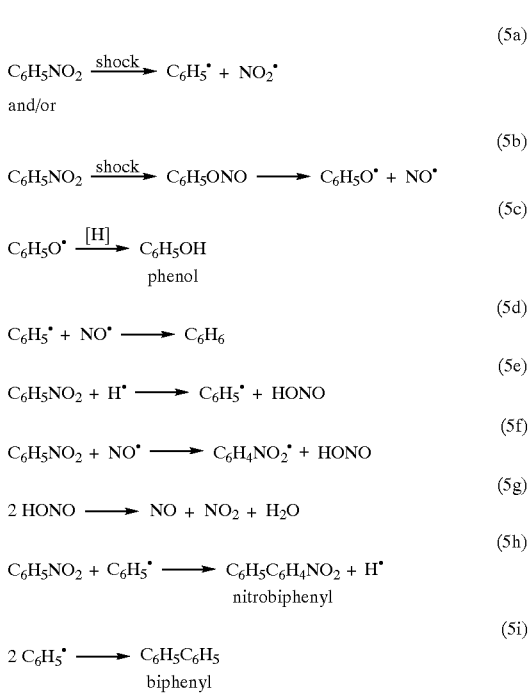

In summary, the occurrence of shock-induced chemical changes in several organic compounds dispersed in Ottawa sand has been demonstrated, establishing the utility of the use of shock waves for remediating contaminated soil.

While the preferred embodiment of the invention has been illustrated and described, it will be appreciated that various changes can be made therein without departing from the spirit and scope of the invention.

LITERATURE CITED

Anderson, W. C. (Ed.), *Innovative Site Remediation Technology*—Eight-Volume Series, WASTECH (American Academy of Environmental Engineers), Annapolis, Md. (1994).

Dodson, B. W. and Arnold, C. Jr., *J. Phys. Chem.*, 87(16):3023–3024 (1983).

Fickett, W. and Davis, W. C., *Detonation*, University of California Press, Los Angeles (1979).

Flinn, J. E., Williamson, R. L., Berry, R. A., Wright, R. N., Gupta, Y. M. and Williams, M., *J. Appl. Phys.* 64(3):1446–1456 (1988).

Graham, R. A., Morosin, B., Venturini, E. L. and Carr, M. J., *Ann. Rev. Mater. Sci.*, 16:315 (1986).

Gupta, Y. M., Keough, D. D., Walter, D. F., Dao, K. C., Henely, D. and Urweider, A., *Rev. Sci. Instr.* 51:183–194 (1980).

Hikichi, K, Ikura, M, and Yasuda, M., *Polymer Journal*, 20(10):851–859 (1988).

Ignatovich, T. N., Barkalov, I. M., Dulin, I. N., Zubarev, V. N., and Yampol'skii, P. A., *High Energy Chem.*, 4:394–397 (1970).

Lee, S. I., Shim, S. C., and Kim, T. J., *J. Polymer Sci.*, Part A: *Polymer Chem.*, 34:2377–2386 (1996).

Lide, D. R., *HandBook of Chemistry and Physics*, 71st ed., CRC Press (991).

Matsunami, S., Watanabe, T., Kamimura, H., and Kakuchi, T., *Polymer*, 37(21):4853–4855 (1996).

Minier, L. M., Brower, K. R., and Oxley, J. C., *J. Org. Chem.*, 56: 06–3314 (1989).

National Materials Advisory Board, National Research Council, *Shock Compression Chemistry in Materials Synthesis and Processing*, Publication NMAB-414, National Academy Press, Washingaton D.C. (1984).

Tirey, D. A., Taylor, P. H., Kasner, J., and Dellinger, B., *Coinhust. Sci. and Tech.*, 74:137–157 (1990).

What is claimed is:

1. A method of treating soil comprising:

(a) determining that soil is contaminated with at least one chemical contaminant; and (b) administering to the soil a shock wave of sufficient amplitude and duration to induce chemical degradation and/or polymerization of the at least one chemical contaminant.

2. The method of claim 1 wherein the shock wave has an amplitude sufficient to result in a peak stress on the soil of about 0.1 to about 50 Gpa.

3. The method of claim 2 wherein the shock wave has an amplitude sufficient to result in a peak stress on the soil of about 2 to about 15 Gpa.

4. The method of claim 1 wherein the shock wave has a duration of about 0.5 to about 500 $\mu$s.

5. The method of claim 4 wherein the shock wave has a duration of about 2 to about 20 $\mu$s.

6. The method of claim 1 wherein a shock wave is administered two or more times.

* * * * *

UNITED STATES PATENT AND TRADEMARK OFFICE
CERTIFICATE OF CORRECTION

PATENT NO.     : 6,204,429 B1
DATED          : March 20, 2001
INVENTOR(S)    : Y.M. Gupta et al.

It is certified that error appears in the above-identified patent and that said Letters Patent is hereby corrected as shown below:

Title page,
Item [56], References Cited, OTHER PUBLICATIONS, "stainless-steal" should read -- stainless-steel --; and "Phenylacety-lene" should break as follows:
-- Phenylacetyl-ene --; and "Tetrachloroet-hylene" should break as follows:
-- Tetrachloro-ethylene --

Column 1,
Line 6, after "1998." delete "+gi"
Line 23, "thiroughout" should read -- throughout --
Line 39, "Priorty" should read -- Priority --
Line 63, "*Eight*-Volume" should read -- Eight-Volume --

Column 2,
Line 12, "*cand*" should read -- *and* --

Column 3,
Line 43, "naplhthalene;" should read -- naphthalene; --

Column 4,
Lines 51-52, "76(1) :1-32" should break as follows: -- 76(1): 1-32 --

Column 5,
Line 1, "infia." should read -- infra. --
Lines 66-67, "wt. %" shouldn't break across lines Column 6,
Line 51, "followincn" should read -- following --

Column 7,
Line 18, "com pounds" should read -- compounds --

UNITED STATES PATENT AND TRADEMARK OFFICE
CERTIFICATE OF CORRECTION

PATENT NO. : 6,204,429 B1  
DATED : March 20, 2001  
INVENTOR(S) : Y.M. Gupta et al.

Page 2 of 3

It is certified that error appears in the above-identified patent and that said Letters Patent is hereby corrected as shown below:

Column 8,  
Line 10, "$CH_2=CCONH_2 + H$" should read -- $CH_2=\overset{\bullet}{C} CONH_2 + \overset{\bullet}{H}$ --  
Line 14, "when H is used" should read -- when $\overset{\bullet}{H}$ is used --

Line 17, "$H + CH_2$" should read -- $\overset{\bullet}{H} + CH_2$ --; and "$CH_3CHCONH_2$" should read  
-- $CH_3\overset{\bullet}{C} HCONH_2$ --  
Line 22, "$CH_3CHCONH_2$" should read -- $CH_3 \overset{\bullet}{C} HCONH_2$ --  
Lines 23 and 24, "$CH_3CHCONH_2CH_2CHCONH_2$" should read -- $CH_3CHCONH_2CH_3\overset{\bullet}{C} HCONH_2$ --  
Line 25, "$CH_3CHCONH_2CH_2CHCONH_2CH_2CHCONH_2$" should read  
-- $CH_3CHCONH_2CH_3CHCONH_2CH_2\overset{\bullet}{C} HCONH_2$ --; and before "etc." insert a space Line 28, "$CH_2CHCONH_2 + H$" should read -- $CH_2 \overset{\bullet}{C} HCONH_2 + \overset{\bullet}{H}$ --  
Line 32, "(i.c.," should read -- (i.e., --

Column 9,  
Line 36, "$C_2Cl_3$" should read -- $C_2\overset{\bullet}{Cl_3}$ --  
Line 49, "iree" should read -- free --  
Line 66, "tlirough" should read -- through --

Column 10,  
Line 43, "e.g." should read -- e.g., --  
Lines 61-62, "triphenylbenzecnes" should read -- triphenylbenzenes --

Column 11,  
Line 20, "cross-liiked" should read -- cross-linked --  
Line 56, "uiireacted" should read -- unreacted --

Column 12,  
Line 22, "$\overset{\bullet}{NO}$ " should read -- $\overset{\bullet}{H}$ --

Line 26, "$\overset{\bullet}{NO}$ " should read -- $\overset{\bullet}{NO_2}$ --

UNITED STATES PATENT AND TRADEMARK OFFICE
CERTIFICATE OF CORRECTION

PATENT NO.    : 6,204,429 B1
DATED         : March 20, 2001
INVENTOR(S)   : Y.M. Gupta et al.

It is certified that error appears in the above-identified patent and that said Letters Patent is hereby corrected as shown below:

<u>Column 13,</u>
Line 8, "56: 06-3314" should read -- 56:3306-3314 --
Line 12, "Washingaton" should read -- Washington --
Line 14, "*Coinhust.*" should read -- *Combust.* --

Signed and Sealed this

Twenty-eighth Day of May, 2002

Attest:

*Attesting Officer*

JAMES E. ROGAN
*Director of the United States Patent and Trademark Office*